R. P. GERFERS.
STEERING WHEEL LOCK.
APPLICATION FILED MAY 20, 1920.
1,368,922.
Patented Feb. 15, 1921.
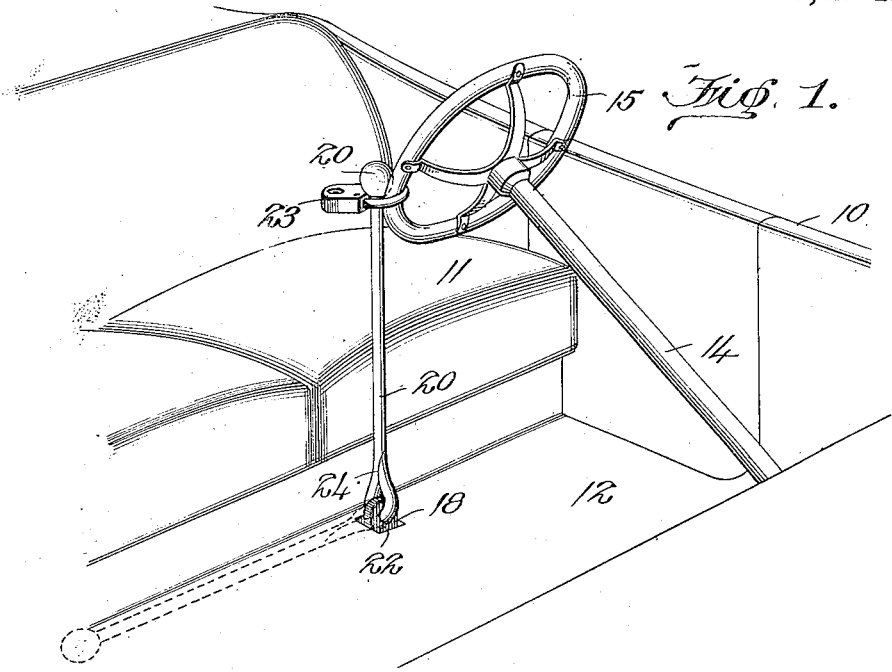
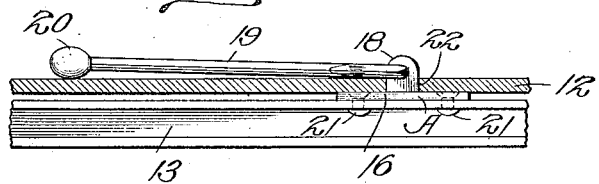
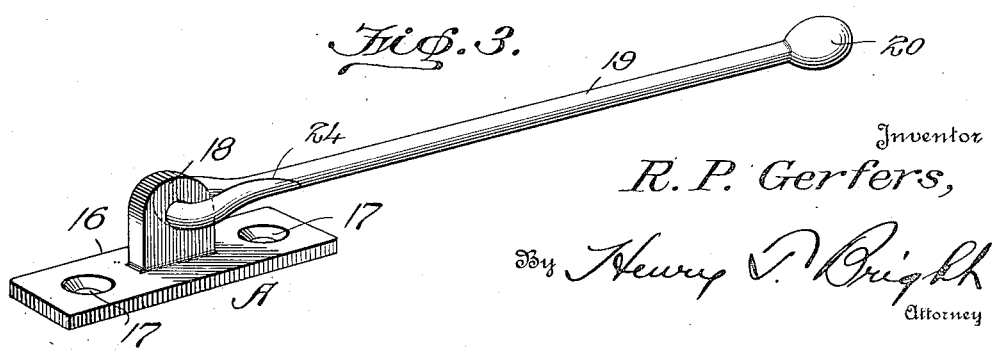
Inventor
R. P. Gerfers,
By Henry T. Bright
Attorney

UNITED STATES PATENT OFFICE.

RICHARD P. GERFERS, OF SAN ANTONIO, TEXAS.

STEERING-WHEEL LOCK.

1,368,922.    Specification of Letters Patent.    Patented Feb. 15, 1921.

Application filed May 20, 1920. Serial No. 382,754.

*To all whom it may concern:*

Be it known that I, RICHARD P. GERFERS, a citizen of the United States, and resident of San Antonio, in the county of Bexar and State of Texas, have invented certain new and useful Improvements in Steering-Wheel Locks, of which the following is a specification.

My invention relates to steering gear locks and while particularly adapted for locking the steering gears of motor vehicles it is applicable to any steering gear embodying a steering wheel.

It is my purpose to provide a device of this character which will avoid the necessity for any specially constructed lock; which embodies parts of simple, cheap and sturdy construction; which may be easily applied to any design of motor vehicle; which will be efficient in operation; and which will be disposed in an unobstructive location when not in use on a motor vehicle and yet easily accessible for application.

With the above and other purposes in view my invention consists in the details of construction and in the arrangement and combination of parts to be hereinafter more fully described and particularly pointed out in the appended claim.

In describing the invention in detail reference will be had to the accompanying drawing wherein like characters of reference denote corresponding parts in the several views, and in which—

Figure 1 is a perspective view of a fragment of a motor vehicle showing the invention applied, the latter being disposed in full lines in locking or active position and in dotted lines in inactive position;

Fig. 2, a transverse section through the automobile just in advance of the driver's seat and disclosing the mounting of the invention, the tie rod element thereof being shown in active position; and Fig. 3, a perspective view of the invention detached.

Referring to the drawing 10 indicates the body of an automobile, 11 the driver's seat, 12 the usual floor, 13 one of the transverse members of the frame of the automobile, 14 the steering column and 15 the steering wheel all of which are of the usual and well known construction.

My invention is shown as comprising a securing bracket A having a base portion 16 provided with bolt holes 17 and having a central upstanding portion 18. Suitably pivoted to the upstanding portion 18 is a tie rod 19, the free end of which is enlarged as at 20. In applying the invention the bracket member A is secured to the transverse frame member 13, which latter is disposed just in advance of the driver's seat 11. The attachment of this bracket to the member 13 is accomplished by suitable fastening devices 21 passed through the hole 17 and through the member 13. The upstanding portion 18 of the bracket A passes through a suitable opening 22 in the floor 12, said opening being large enough to permit the passage of the tie rod 19 and the pivot connection between the same and the upstanding portion 18 therethrough. When the device is applied as shown in Fig. 1 the tie rod in its inactive position will rest upon the floor 12 very close to the front of the driver's seat 11 and thereby be disposed entirely out of the way. When the tie rod is swung upwardly from the position shown in full lines in Fig. 1, said rod will engage the steering wheel 15 at a point just beneath the enlarged portion 20 of the free end thereof. When the tie rod is thus disposed the shackle of any ordinary lock 23 is passed around the steering wheel and around the tie rod 19 beneath the enlarged portion 20 and in this manner the tie rod is securely locked to the steering wheel in a way that will positively prevent any material steering movement being imparted thereto. To release the steering wheel from its locked status it is only necessary to disengage the lock 23 and allow the tie rod 19 to return to the position shown in dotted lines in Fig. 1.

From the foregoing it will be apparent that I have provided an exceedingly simple locking device for steering gears embodying a steering wheel which is composed of very few parts and all of these are of simple and sturdy construction. It will be further apparent that my locking device can be easily associated with any automobile irrespective of its design and when so associated will be efficient in operation and in no way interfere with the driver or passengers when disposed in inactive position.

The manner of pivoting the tie rod 19 to the extension 18 of the bracket A can be varied although I have shown a very simple method of accomplishing that end which consists in passing one end of the tie rod through a suitable opening in the extension 18 and then looping it around the extension and if desirable welding the free end of the returned portion of the rod to the main body portion at 24.

I claim—

A locking device for wheel operated steering gears comprising a steering wheel, a rod having one end enlarged and its other end pivoted to a fixed part in such position relative to the steering wheel as to engage the periphery of the latter at a point below its enlarged end when swung to a substantially upright position, and a shackle lock having its shackle engaged around the felly of the steering wheel and around the rod below the enlarged end thereof to lock the rod to the wheel.

In testimony whereof I hereunto affix my signature in the presence of two witnesses.

RICHARD P. GERFERS.

Witnesses:
  M. S. HALLAM,
  PERRY S. ROBERTSON.